United States Patent Office 3,230,327
Patented Jan. 18, 1966

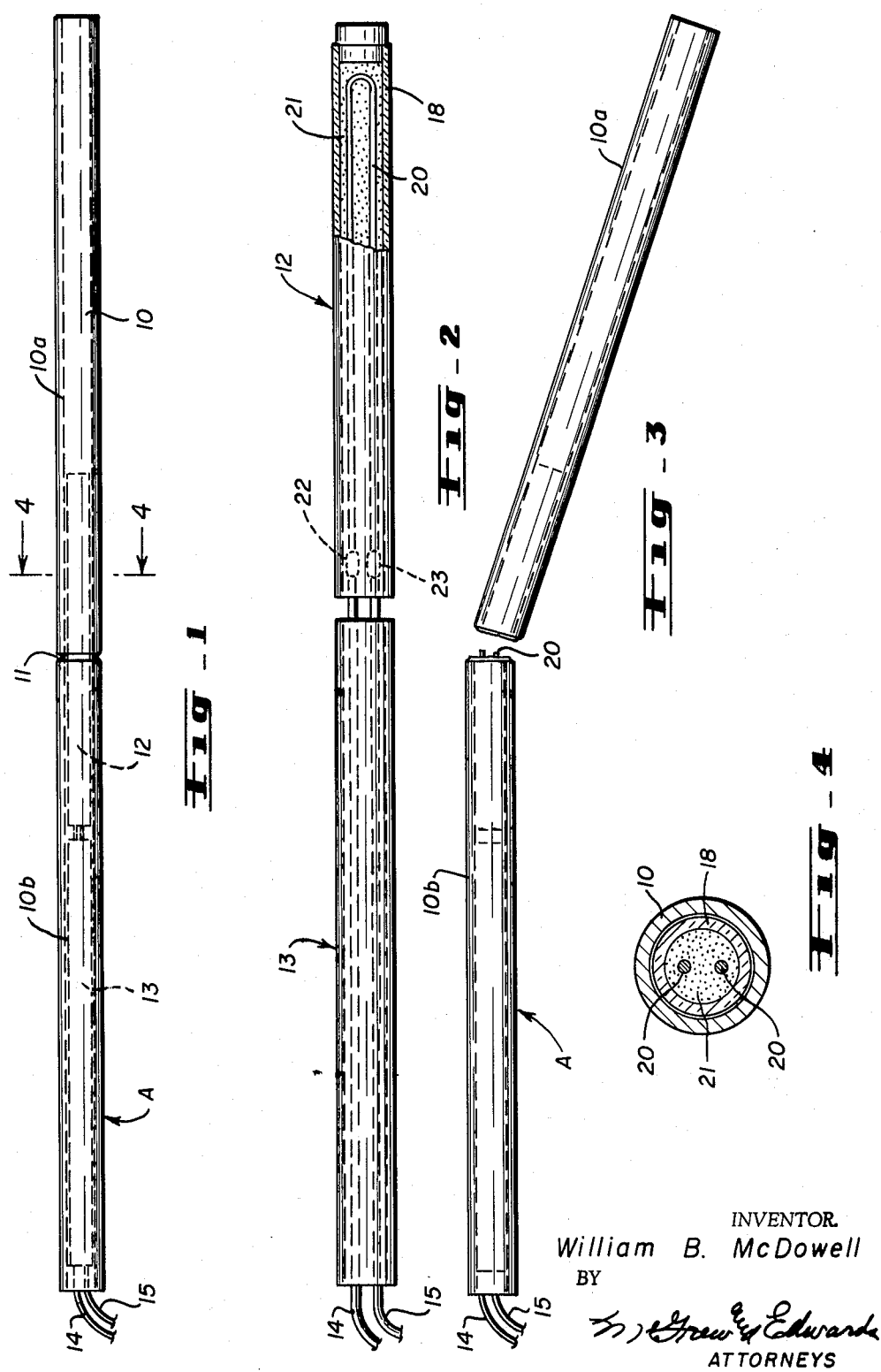

3,230,327
FRANGIBLE CONDUCTOR TYPE CIRCUIT BREAKER FOR ELECTRICAL MACHINERY
William B. McDowell, 845 6th St., Boulder, Colo.
Filed July 15, 1963, Ser. No. 295,004
6 Claims. (Cl. 200—61.08)

This invention relates to circuit breakers and more particularly to circuit breakers arranged as safety devices for electrical machinery wherein at least one line of the power leads to electrical equipment is completely broken, thereby breaking the circuit to prevent further operation thereof.

During the operation of machinery run by electrical motors and the like breakdowns do occur, and it is important to prevent damage or injury to personnel to positively break the circuit to the electrical equipment to prevent further operation until repairs have been made. This is particularly true in equipment which is used for the transportation of persons, such as aerial tramways, ski lifts, and the like. With such equipment it is not unheard of to have the rope (cable) which is used for the transportation to jump the pulleys. To prevent damage to the equipment when the ropes or cables are not in proper position on the pulleys, the electric motors driving the equipment must be positively stopped and preferably remain off until repairs are completed. It is, therefore, a principal object of the invention to provide a safety switch which positively breaks the electric circuit to drive motors of moving cable tramways.

Another object of the invention is to provide a safety switch which breaks the circuit of electrical equipment on a malfunction of the moving parts of such equipment.

It is still another object of the invention to provide a safety switch which, when breaking the circuit, provides a positive break for such circuit and prevents the circuit from being reclosed without a complete replacement of the safety switch.

A further object of the invention is to provide a safety switch which may be arranged for varying the pressure or force necessary to break a circuit in which the switch is connected.

These and other objects and advantages of the invention may be readily ascertained by referring to the following description and appended illustrations.

FIG. 1 is a plan view of a circuit breaker according to the invention;

FIG. 2 is an enlarged detail, in plan, of the inner portion of the device of the invention;

FIG. 3 is a plan view illustrating the breaking of the device and the circuit in which it is used; and FIG. 4 is an end elevational view of the break of the device of FIG. 3.

In general, the device of the invention provides an elongated tube or rod which is breakable at a predetermined point. One of the leads of the circuit of electrical equipment is mounted in the rod with a brittle conductor portion at a weakened point which is arranged to break whereby when a moving part of the machine is misplaced on a malfunction it presses or strikes against the rod to break it at its weakened point, breaking the brittle lead wire to break the circuit.

In the specific form of the invention selected for illustration only, a tubular member 10 is arranged to be mounted in a cantilever position, being secured about the end A. The tube has outer end 10a and inner end 10b separated by a weakened portion 11. The mounting of the tubular member 10 is determined by the amount of force required to break the tube. The weakened portion 11 of the tube 10 which is, in the case of an aluminum tube, a milled-out groove leaving a thin wall, and the outer end 10a of the tube is held to the inner end 10b by the remaining thin section of the wall of the tube. A frangible member 12 is secured inside the tube in position to straddle the groove 11 and break when the tube is broken. A support 13 is attached to the member 12 and is mounted in the tube 10. The leads or conductors 14 and 15 extend through the support member 13 and into the frangible portion 12, as explained below.

The frangible portion of the safety device in one form includes a tube 18 (FIG. 2) in which is mounted a brittle wire 20 which is supported in its position in the tube 18 by potting compound 21. In the form of the invention shown, a glass tube 18 is used to support the brittle wire 20 and an epoxy or other hardening type potting compound is used to support the wire in position. The potting compound must be non-conductive and it must harden and be breakable so that when the frangible portion 12 is broken the ends of the severed wires remaining in the end 10b cannot touch. Thus a potting compound such as an epoxy or other resin which sets hard provides a means for maintaining the ends of the broken wires apart.

The leads 14 and 15 pass through the tube 13, which may be aluminum, steel or the like, to the positions 22 and 23 where they are joined to a brittle U-shaped wire 20. The brittle wire 20 with attached leads is then positioned internally of the frangible member 12 and the potting material 21 is poured into the tube. The wires are held in position until the potting compound sets sufficiently to support them in position. The wires may be joined together by welding, twisting, wrapping or the like. As shown in FIG. 4 the frangible tube 18 should be a fairly snug fit in the rod 10 so that there will be little movement of the frangible tube on breaking the outer tube 10. The brittle wire may be a conductor which is easily broken, and in one case a tool steel wire is used to make the U-shaped portion.

In one application an aluminum tube about 2 feet long and about half an inch O.D. and ⅜ inch I.D. is used for the device. A clamp or similar means at about point A is used to clamp the cantilever rod to a support (not shown) extending at right angles to and adjacent at least one of the two strands of a wire rope aerial tramway and at any point along the stretch of rope. The position of the rod in relation to the wire rope may be determined by the amount of force which will be required or desired to break the rod at the weakened point 11. The rod thus may be placed cloosely to the rope so that any undue movement of the rope may snap the rod and break the conductor 20, thereby breaking the circuit in which it is entered. Also, the rod may be placed so that the wire rope is positioned near the weakened spot 11 or adjacent the outer end of the rod or at intermediate points. The positions closer to the weakened point require more force to break the device than at the outer end. By mounting the rod in its cantilever position adjacent the wire rope and by having point A near the weakened area 11 as well as having the strike area near the weakened area and on the opposite side, a rather large force will be necessary to break the rod. As the wire rope strike position is moved toward the outer end of the rod (so that the rope, if it leaves the pulley, strikes the rod near its outer end) less force will be required to break the rod.

As illustrated in FIG. 3, the tube 10, having been supported as a cantilever beam at about point A, has been broken, as by the action of a wire rope or other part of machinery out of proper operation, so that the outer end 10a of the tube is broken completely away from the inner tube member 10b. On breaking the tube the frangible member 12 is, likewise, broken, severing the U-shaped conductor 20 and breaking the circuit into which wires 14 and 15 are attached.

In connecting the device into a circuit the leads 14 and 15 are connected directly into the circuit, generally in the hot line, so that no accidental grounding will permit the electric equipment to operate. The exact connection of the leads 14 and 15 into the circuit should be determined by a competent engineer. In any event, when the leads are properly connected into the circuit the breaking of the conductor 20 breaks the circuit and all electrical equipment in that circuit will cease operation. Additionally, the equipment cannot again be operated until the safety device has been replaced by an intact device, that is, one which has not broken. In this manner the shutdown of the electrical equipment is positive until repairs have been made and a new safety device has been entered into the circuit.

The device has been illustrated by an open tube 10; however, it is obvious that it may be a rod or the tube 10 may be closed, either with a continuous end member or any sort of a cover. The whole device may be filled with a potting material with the weakened section arranged to break the conductor 20 in the event of malfunction of the electrical equipment in which the safety device is attached. In addition, the frangible member 20 may be made of glass, plastic or any other easily frangible material which will permit the brittle conductor 20 to be broken when the tube 10 is severed into two distinct parts. Of course, the frangible tube may be made of any non-conductor or filled with any non-conductor to form a frangible member.

While the invention has been described with reference to particular illustrations, there is no intent to limit the spirit or the scope of the invention to the precise details so set forth, except as defined in the following claims.

I claim:

1. A circuit breaker comprising a cantilever mounted elongated member fixedly mounted by one end with other end free, a weakened area intermediate the ends of said member whereby said member may be broken by a predetermined force, a brittle conductor mounted in said member in position to straddle said weakened area whereby breaking said member breaks said brittle conductor, said conductor being encased in a non-conductive material holding said brittle conductor out of contact with other electrically conducting material, and circuit leads extending through the fixed end of said member and interconnected with said brittle conductor.

2. A circuit breaker comprising a cantilever mounted elongated tubular member, a groove in the wall of said tubular member forming a weakened area, a brittle conductor mounted in said tubular member in position to straddle said weakened area whereby breaking said tubular member breaks said brittle conductor, said conductor being encased in a non-conductive potting material holding said britle conductor out of contact with other electrically conducting material, and circuit leads interconnected with said brittle conductor.

3. A circuit breaker comprising a cantilever mounted elongated tubular member, a weakened area intermediate the ends of said tubular member, a U-shaped brittle conductor mounted in said tubular member in position to straddle said weakened area whereby breaking said tubular member breaks said brittle conductor, non-conductive potting material encasing a portion of said conductor substantially filling a portion of said tubular member adjacent said weakened area and holding said brittle conductor out of contact with other electrically conducting material, and circuit leads interconnected with said brittle conductor.

4. A circuit breaker comprising a cantilever mounted elongated tubular member arranged to be positioned adjacent moving machinery for sensing malfunctioning of such machinery, said tubular member having a weakened wall area intermediate its ends and arranged to break on being contacted by malfunctioning machinery, a brittle U-shaped conductor mounted in said tube straddling said weakened wall area, said U-shaped conductor being encased in a frangible non-conductive potting material, whereby breaking said tubular member breaks said potting material, said conductor and said potting material holds the ends of said conductor out of contact with one another, and circuit leads interconnected with each end of said U-shaped conductor.

5. A circuit breaker comprising an elongated member arranged to be positioned adjacent moving machinery, said member having a weakened area intermediate its ends and arranged to break into two separate parts on being contacted by malfunctioning machinery, a brittle U-shaped conductor mounted in said member straddling said weakened area, said U-shaped conductor being encased in non-conductive material, whereby breaking said member breaks said container and said non-conductive material and said non-conductive material holds the ends of said conductor out of contact with one another, and circuit leads interconnected with each end of said U-shaped conductor.

6. A circuit breaker comprising a cantilevered elongated tubular member arranged to be positioned adjacent moving machinery for sensing malfunctioning of such machinery, said tubular member having a weakened wall area intermediate its ends and arranged to break on being contacted by malfunctioning machinery, a brittle U-shaped conductor mounted in said tube straddling said weakened wall area, said U-shaped conductor being encased in a non-conductive potting material, said potting material being mounted in a frangible container which substantially fills said tubular member at said weakened wall area, whereby breaking said tubular member breaks said container and said potting material and said conductor, said potting material being sufficiently rigid to hold the ends of said conductor out of contact with one another, and circuit leads interconnected with each end of said U-shaped conductor.

References Cited by the Examiner

UNITED STATES PATENTS

| | | | |
|---|---|---|---|
| 1,281,329 | 10/1918 | Flannery et al. | 200—61.08 |
| 2,105,286 | 1/1938 | Jennings | 200—52 |

BERNARD A. GILHEANY, *Primary Examiner.*